(12) United States Patent
Tsukamoto et al.

(10) Patent No.: US 7,843,169 B1
(45) Date of Patent: *Nov. 30, 2010

(54) PACK ASSEMBLY HAVING INTERCONNECTED BATTERY PACKS CONFIGURED TO BE INDIVIDUALLY DISCONNECTED FROM ASSEMBLY

(75) Inventors: Hisashi Tsukamoto, Santa Clarita, CA (US); Tiehua Piao, Valencia, CA (US); Taison Tan, Pasadena, CA (US)

(73) Assignee: Quallion LLC, Sylmar, CA (US)

( * ) Notice: Subject to any disclaimer, the term of this patent is extended or adjusted under 35 U.S.C. 154(b) by 433 days.

This patent is subject to a terminal disclaimer.

(21) Appl. No.: 11/824,816

(22) Filed: Jul. 3, 2007

Related U.S. Application Data

(60) Provisional application No. 60/819,421, filed on Jul. 6, 2006.

(51) Int. Cl.
*H01M 10/46* (2006.01)
(52) U.S. Cl. ...................................... 320/117
(58) Field of Classification Search .............. 320/107, 320/112, 116, 117, 119; 429/96, 97, 98, 429/99, 100
See application file for complete search history.

(56) References Cited

U.S. PATENT DOCUMENTS

| | | |
|---|---|---|
| 2,901,526 A | 8/1959 | Alton et al. |
| 3,769,095 A | 10/1973 | Schmidt |
| 4,255,782 A | 3/1981 | Joyce |
| 4,916,034 A | 4/1990 | Hulsebus et al. |
| 4,957,829 A | 9/1990 | Holl |
| 5,017,441 A | 5/1991 | Linder |
| 5,140,744 A | 8/1992 | Miller |
| 5,298,341 A | 3/1994 | Khandkar et al. |
| 5,302,110 A | 4/1994 | Desai et al. |
| 5,378,555 A | 1/1995 | Waters et al. |
| 5,437,939 A | 8/1995 | Beckley |
| 5,504,415 A | 4/1996 | Podrazhansky et al. |
| 5,516,603 A | 5/1996 | Holcombe |
| 5,534,765 A | 7/1996 | Kreisinger et al. |
| 5,567,544 A | 10/1996 | Lyman |
| 5,596,567 A | 1/1997 | deMuro et al. |
| 5,639,571 A | 6/1997 | Waters et al. |
| 5,641,587 A | 6/1997 | Mitchell et al. |
| 5,652,499 A | 7/1997 | Morita et al. |

(Continued)

FOREIGN PATENT DOCUMENTS

EP 1460698 A1 9/2004

*Primary Examiner*—Edward Tso
(74) *Attorney, Agent, or Firm*—Gavrilovich, Dodd & Lindsey, LLP

(57) ABSTRACT

A battery pack system is disclosed. The battery pack system includes a battery pack having batteries arranged in a plurality of parallel groups that are connected in series. Each parallel group includes a plurality of the batteries connected in parallel. The electronics are configured to drop the current at which the battery pack is operating from a first current level to a second current level one or more times. The second current level is lower than the first current level. The electronics can drop the current from the first current level to the second current level during the charge and/or discharge of the battery pack. In some instances, the electronics intermittently drop the current from the first current level to the second current level during the charge and/or discharge of the battery pack.

10 Claims, 6 Drawing Sheets

U.S. PATENT DOCUMENTS

| | | | |
|---|---|---|---|
| 5,709,280 A | 1/1998 | Beckley et al. | |
| 5,736,272 A | 4/1998 | Veenstra et al. | |
| 5,851,695 A | 12/1998 | Misra et al. | |
| 5,969,503 A | 10/1999 | Davis et al. | |
| 6,002,240 A | 12/1999 | McMahan et al. | |
| 6,094,034 A | 7/2000 | Matsuura | |
| 6,140,927 A | 10/2000 | Whitmire | |
| 6,373,222 B2 | 4/2002 | Odaohhara | |
| 6,377,432 B1 | 4/2002 | Hashimoto | |
| 6,420,851 B1 | 7/2002 | Schoofs et al. | |
| 6,430,692 B1* | 8/2002 | Kimble et al. | 320/117 |
| 6,462,551 B1 | 10/2002 | Coates et al. | |
| 6,465,986 B1 | 10/2002 | Haba | |
| 6,479,927 B1 | 11/2002 | Hilderbrand | |
| 6,524,739 B1 | 2/2003 | Iwaizono et al. | |
| 6,565,986 B2 | 5/2003 | Itoh | |
| 6,586,132 B1 | 7/2003 | Fukuda et al. | |
| 6,639,408 B2 | 10/2003 | Yudahira et al. | |
| 6,781,343 B1 | 8/2004 | Demachi et al. | |
| 6,980,859 B2 | 12/2005 | Powers et al. | |
| 7,479,346 B1 | 1/2009 | Chow et al. | |
| 7,573,233 B1 | 8/2009 | Chow et al. | |
| 7,573,234 B1* | 8/2009 | Tsukamoto et al. | 320/116 |
| 2002/0183801 A1 | 12/2002 | Howard et al. | |
| 2003/0013009 A1 | 1/2003 | Dansui et al. | |
| 2003/0042870 A1 | 3/2003 | Yau et al. | |
| 2003/0058595 A1 | 3/2003 | Murabayashi et al. | |
| 2003/0129457 A1 | 7/2003 | Kawai et al. | |
| 2003/0152830 A1 | 8/2003 | Eaves | |
| 2003/0186116 A1 | 10/2003 | Tanjou | |
| 2004/0018419 A1 | 1/2004 | Sugimoto et al. | |
| 2004/0058233 A1 | 3/2004 | Hamada et al. | |
| 2004/0095098 A1 | 5/2004 | Turner et al. | |
| 2004/0096713 A1 | 5/2004 | Ballantine et al. | |
| 2004/0201365 A1 | 10/2004 | Dasgupta et al. | |
| 2004/0253512 A1 | 12/2004 | Watanabe et al. | |
| 2005/0007068 A1 | 1/2005 | Johnson et al. | |
| 2005/0042505 A1 | 2/2005 | Cooper et al. | |
| 2005/0140335 A1 | 6/2005 | Lee et al. | |
| 2005/0269995 A1 | 12/2005 | Donnelly et al. | |
| 2006/0076923 A1 | 4/2006 | Eaves | |
| 2006/0208692 A1 | 9/2006 | Kejha | |
| 2007/0029124 A1 | 2/2007 | DasGupta et al. | |
| 2007/0126400 A1* | 6/2007 | Benckenstein et al. | 320/119 |
| 2008/0063934 A1 | 3/2008 | Bechtold et al. | |
| 2009/0280400 A1 | 11/2009 | Tsukamoto | |

* cited by examiner

PACK ASSEMBLY HAVING INTERCONNECTED BATTERY PACKS CONFIGURED TO BE INDIVIDUALLY DISCONNECTED FROM ASSEMBLY

RELATED APPLICATIONS

This Application claims the benefit of U.S. Provisional Patent Application Ser. No. 60/819,421, filed on Jul. 6, 2006, entitled "Battery Pack System" and incorporated herein in its entirety.

This Application is related to U.S. Provisional Patent Application Ser. No. 60/740,204, filed on Nov. 28, 2005, entitled "Battery Pack System," and to U.S. Provisional Patent Application Ser. No. 60/753,862, filed on Dec. 12, 2005, entitled "Battery Pack System," each of which is incorporated herein in its entirety.

FIELD

The present invention relates to power sources and more particularly to interconnection of multiple power sources.

BACKGROUND

As batteries play a larger role in powering the movement of vehicles such as cars, battery systems that employ a plurality of interconnected batteries have been designed. It is often desirable to use switches to disconnect one or more of the batteries from the system. However, using a switch to disconnect a battery from the system can result in the switch being exposed to the voltage of the entire system. Switches with higher voltage tolerance are larger and more expensive that switches with lower voltage tolerances. As a result, there is a need for a battery system with reduced cost and size.

SUMMARY

A power source includes a battery pack system having a pack assembly. The pack assembly includes a plurality of system parallel groups connected in series. Each system parallel group includes a plurality of battery packs connected in parallel. Each battery pack includes a battery assembly having a plurality of parallel groups connected in series. Each parallel group includes a plurality of batteries connected in parallel. The battery packs also include electronics configured to electrically disconnect the battery pack from the pack assembly.

One embodiment of the power source includes a battery pack system having a pack assembly. The pack assembly includes a plurality of system parallel groups connected in series and a plurality of system series groups connected in parallel. Each system parallel group includes a plurality of battery packs connected in parallel and each system series group includes a plurality of the batter packs connected in series. The battery pack system also includes a pack assembly switch configured so as to electrically connect and disconnect the pack assembly from the power source. Each battery pack includes a battery assembly having a plurality of parallel groups connected in series and a plurality of series groups connected in parallel. Each parallel group includes a plurality of batteries connected in parallel and each series group including a plurality of the batteries connected in series. The battery pack includes a battery assembly switch configured so as to electrically connect and electrically disconnect the battery assembly from the battery pack system. The battery assembly switch has a lower voltage tolerance than the pack assembly switch. In some instances, the battery assembly switch has a voltage tolerance less than $\frac{1}{10}$th of the voltage tolerance of the pack assembly switch.

In one example, the pack assembly switch is a relay and the battery assembly switch is a Field Effect Transistor.

DESCRIPTION

The battery pack system includes a pack assembly having plurality of battery packs connected in parallel groups that are connected in series. Each parallel group includes a plurality of battery packs connected in parallel. Since the battery packs are connected in parallel, disconnecting one of the battery packs from the pack assembly does not expose that battery pack to the voltage of the entire pack assembly. As a result, a switch employed to disconnect the battery pack need only have a voltage tolerance sufficient to tolerate the voltage of the battery pack. In many instances, this arrangement permits small, low cost switches such as Field Effect Transistor to be employed to disconnect the battery packs from the pack assembly.

Figure 1A:
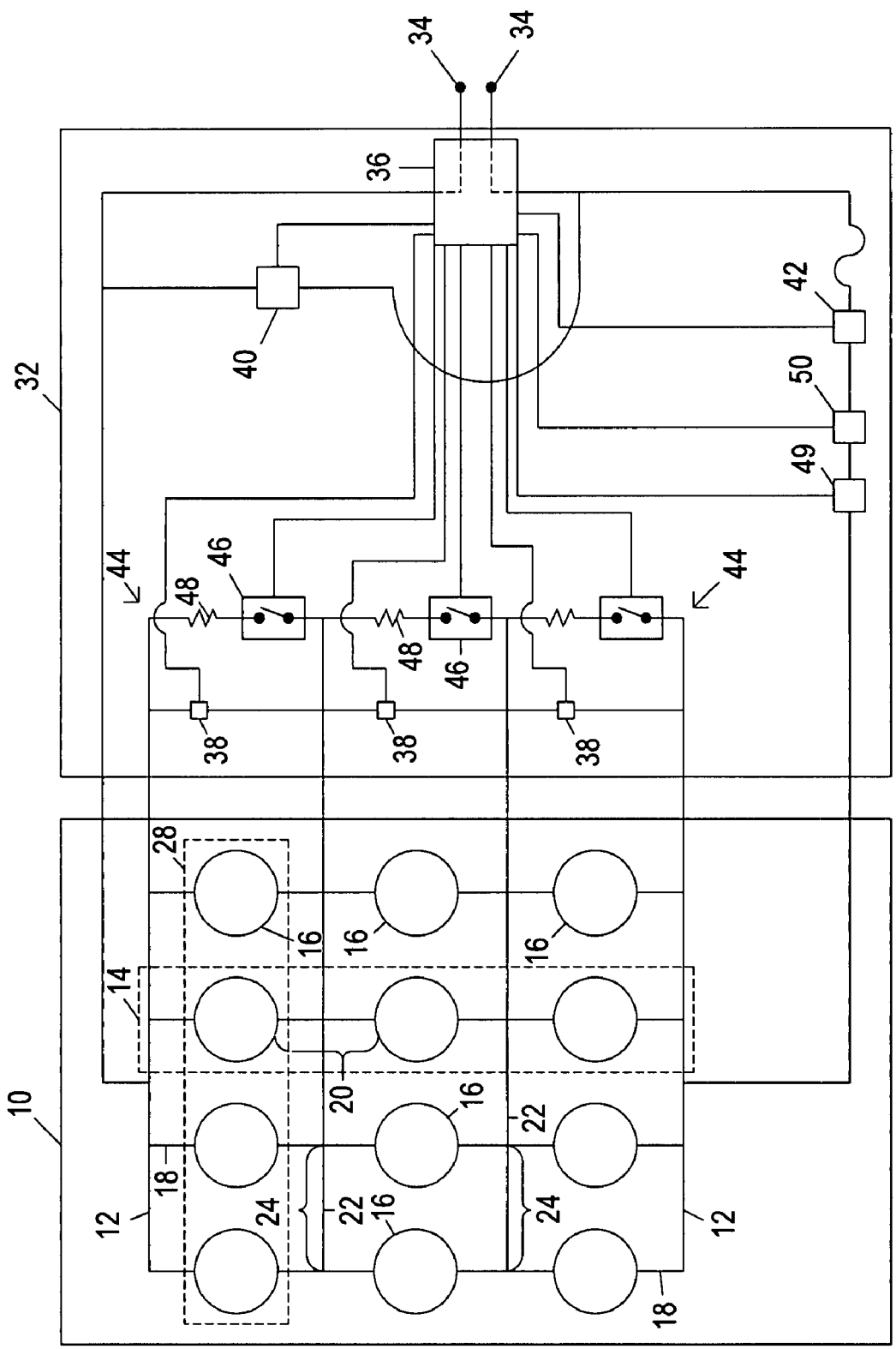
FIG. 1A is a schematic diagram of a battery pack. The battery pack includes electronics configured to control the charge and/or discharge of a battery pack.

FIG. 1A is a schematic diagram of a battery pack. The battery pack includes a battery assembly 10. The battery assembly 10 includes two primary parallel lines 12 that connect three series groups 14 in parallel. The series groups 14 each include three batteries 16 connected in series. Primary series lines 18 each provide electrical communication between a series group 14 and a primary parallel line 12 and secondary series lines 20 provide electrical communication between the batteries 16 connected in series.

The battery assembly 10 also includes a plurality of secondary parallel lines 22. The secondary parallel lines 22 each include one or more cross lines 24 that provide electrical communication between the secondary series lines 20 in different series groups 14. Accordingly, each secondary parallel line 22 provides a parallel connection between the batteries 16 in different series group 14. For instance, each secondary parallel line 22 provides electrical communication between different series groups 14 such that a battery 16 in one of the series groups 14 is connected in parallel with a battery 16 in the other series groups 14. Because a single secondary parallel line 22 only provides one of the parallel connections, another connection is needed to connect batteries 16 in parallel. The other parallel connection can be provided by another secondary parallel line 22 or by a primary parallel line 12. Each of the batteries 16 connected in parallel belongs to a parallel group 28. Accordingly, the battery assembly 10 of FIG. 1A includes three parallel groups 28.

Figure 1B:
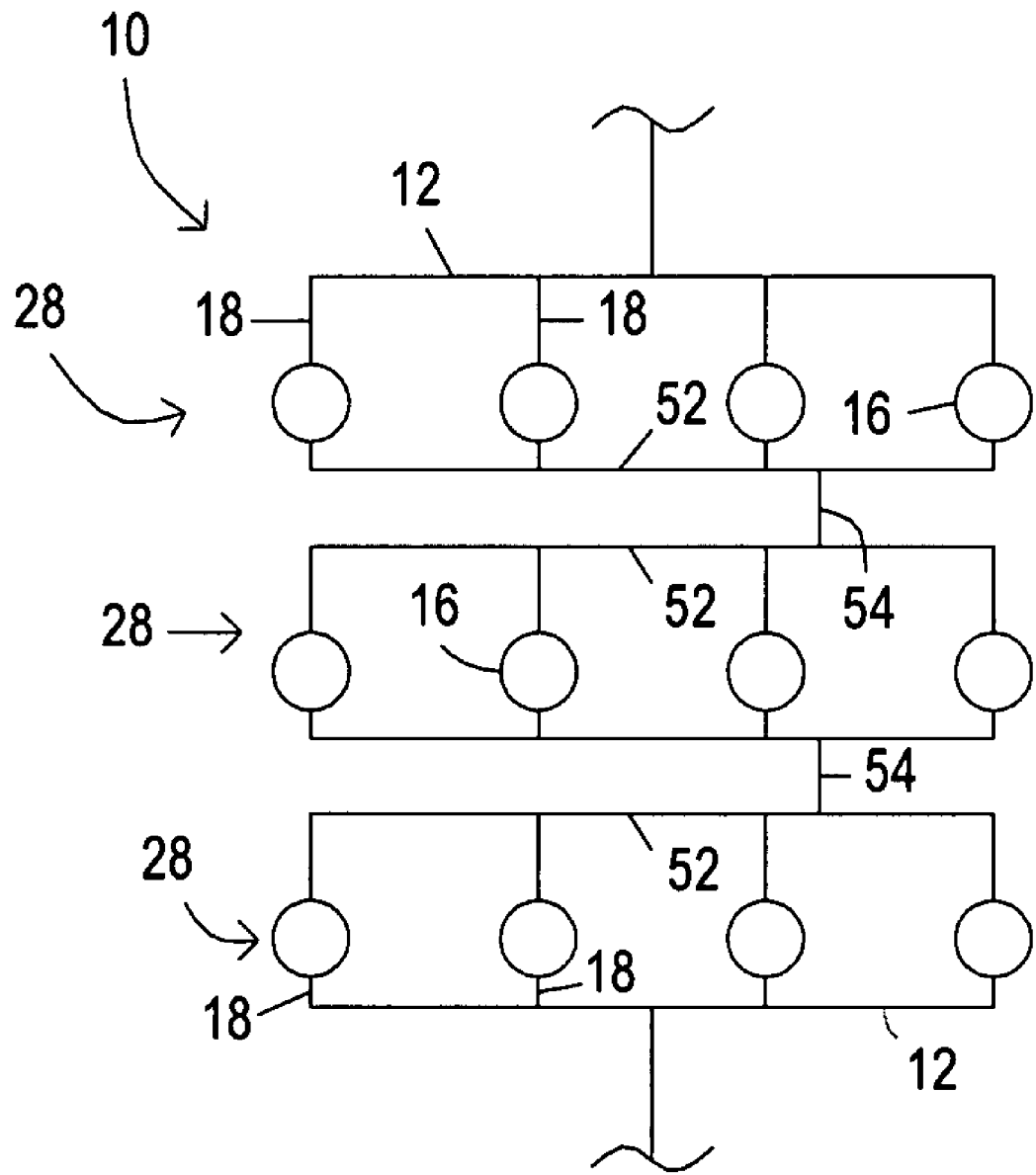
FIG. 1B is an alternate schematic for the batteries in the battery pack of FIG. 1A.

FIG. 1B illustrates another suitable embodiment of the battery assembly 10. The battery assembly 10 includes a plurality of parallel groups connected in series as shown in FIG. 1B but does not include series groups as shown in FIG. 1A. In FIG. 1B, two parallel lines 52 connected by a series line 54 replace the secondary parallel lines of FIG. 1A. The use of series groups illustrated in FIG. 1A may be preferable to the battery assembly 10 of FIG. 1B because all of the pack current must pass through the series lines of FIG. 1B. As a result, the series lines may need to be larger than other lines in the battery pack and accordingly may add weight to the battery pack.

The battery assembly 10 of FIG. 1A and/or FIG. 1B can be scaled to include more batteries or fewer batteries. For instance, the battery assembly 10 can include four or more batteries, twelve or more batteries, twenty-five or more batteries, eighty-one or more batteries, one hundred or more batteries. The number of batteries in each parallel group can be the same or different from the number of batteries in each series group 14. The number of batteries in each series group 14 can be increased in order to increase the voltage of the system or decreased in order to decrease the voltage of the system. Each series group 14 can include two or more batteries; four or more batteries; more than eight batteries; or fifteen or more batteries. The number of series groups 14 can be increased for applications that require higher power levels or decreased for applications that require lower power levels. In one embodiment, the battery pack includes only one parallel group and no series groups. The battery pack can include two or more series groups; four or more series groups; ten or more series groups; or fifteen or more series groups 70.

The connections between the batteries can be standard methods for connecting batteries. The connections between the batteries and the conductors can be made using connection methods that are suitable for the amount of current and power that will be delivered by the battery. For instance, conductors can be connected to a battery by welding. Additionally or alternately, one or more of the primary parallel lines and the connected primary series lines can optionally be integrated into a single line. For instance, a single wire, cable, piece of sheet metal, or metal bar can serve as both a primary parallel line and as the connected primary series lines. Additionally or alternately, one or more the secondary parallel lines and the connected secondary series lines can optionally be integrated into a single line. For instance, a single wire, cable, piece of sheet metal, or metal bar can serve as both a secondary parallel line and as the connected secondary series lines.

The battery pack of FIG. 1A includes electronics 32 in electrical communication with the battery assembly 10 and with terminals 34 that serve as the terminals 34 for the battery pack. Accordingly, the output from the battery assembly 10 can be received at the terminals 34. The battery assembly 10 can be recharged by applying a potential across the terminals 34.

The electronics 32 include a processor 36 that executes the functions of the electronics 32 and/or the battery pack. Suitable processors 36 include, but are not limited to, firmware, hardware and software or a combination thereof. Examples of suitable processors 36 include, but are not limited to, analog electrical circuits, digital electrical circuits, processors 36, microprocessors 36, digital signal processors 36 (DSPs), computers, microcomputers, ASICs, and discrete electrical components, or combinations suitable for performing the required control functions. In some instances, the electronics 32 include one or more memories (not shown) and one or more processing units such as a CPU. The one or more memories can include instructions to be executed by the processor 36 while executing the functions of the electronics and/or the battery pack.

The electronics 32 include one or more first voltage sensors 38 in electrical communication with the processor 36. The processor 36 can employ each first voltage sensor 38 to monitor the voltage of a parallel group. Suitable first voltage sensors 38 include, but are not limited to, voltmeters. The electronics 32 include a second voltage sensor 40 in electrical communication with the processor 36. The processor 36 can employ the second voltmeter to monitor the voltage of the battery assembly 10. Suitable second voltage sensor s40 include, but are not limited to, voltmeters. The electronics 32 include a current sensor 42 in electrical communication with the processor 36. A suitable sensor includes, but is not limited to, an ammeter. The processor 36 can employ the current sensor 42 to monitor the current through the battery assembly 10 during the charging and/or discharging of the battery assembly 10.

The electronics 32 can include one or more shunt circuits 44 connected in parallel with a parallel group. A shunt circuit 44 can include one or more switches 46 and one or more resistors 48. For instance, the battery pack of FIG. 1A includes a plurality of shunt circuits 44 that are each configured to provide a current pathway around a parallel group and to effectively by-pass the parallel group. Each shunt circuit 44 includes a switch 46 connected in series with one or more resistors 48. The switches 46 can be operated by the processor 36. Each switch 46 is arranged such that one of the parallel groups is bypassed when the switch 46 is closed but the shunt circuit 44 is an open circuit when the switch 46 is open. Accordingly, the parallel group is not shunted when switch 46 is open. When a switch 46 is closed, the associated resistor 48 is selected to prevent the functioning batteries in the bypassed parallel group from being short-circuited.

During operation of the battery pack, a differential may develop between the voltage of different parallel groups. In some instances, the voltage of one or more parallel groups may rise to levels that are undesirably high or fall to levels that are undesirably low. For instance, the voltage of one or more parallel groups may rise above an upper threshold while charging the battery pack or fall below a lower threshold while discharging the battery pack. Examples of the upper threshold include, but are not limited to, the maximum operational voltage of a battery, the maximum voltage to which a battery pack should be charged, a threshold above which damage to the batteries in a parallel group may occur or above which the battery becomes unsafe for normal operation. Examples of the upper threshold include, but are not limited to, the minimum operational voltage of a battery or a threshold below which damage to the batteries in a parallel group may occur or below which the battery becomes unsafe for normal operation. In these instances, the electronics 32 can employ a switch 46 in a shunt circuit 44 to provide a bypass around the parallel group that is above the upper threshold or below the lower threshold. As a result, that parallel group is effectively removed from the battery assembly 10 permitting continued charging and/or discharging of the battery pack.

In some instances, the electronics 32 close the switch 46 in an open shunt circuit 44 after the battery pack is done charging or done discharging. For instance, when the switch 46 in one or more shunt circuits 44 is opened while charging, the electronics 32 can close those switches 46 to return the bypassed parallel groups to the battery assembly 10. As a result, the batteries in those parallel groups contribute to any subsequent discharge of the battery assembly 10.

When the electronics 32 open or close the switches 46 in one or more of the shunt circuits 44, the electronics 32 can adjust one or more other parameters that the electronics 32 employ in the charge or discharge of the battery pack. For instance, when the electronics 32 open a switch 46 in a shunt circuit 44, the electronics 32 can reduce the voltage to which the battery pack is charged to prevent over-charging of the battery pack.

The shunt circuits 44 can also be employed in response to other fault condition in the battery pack. For instance, experiments have shown that a parallel group that includes a battery that has or develops an unusually high self-discharge will contribute to the functioning of the battery pack for several cycles but subsequent cycling can cause the voltage of the parallel group to drop to an undesirably low level that can adversely affect the performance of the battery pack. Accordingly, the electronics 32 can employ a shunt circuit 44 to bypass a parallel group once the voltage of the parallel group falls below a threshold. When the electronics 32 employ a shunt circuit 44 in response to the voltage of a parallel group falling below a threshold, the shunt circuit 44 is preferably employed when the voltage of the parallel group is at or below the threshold to reduce issues associated with shorting of more highly charged batteries as a result of employing the shunt circuit 44. The threshold can be higher than the minimum operational voltage of the batteries in the battery pack. Additionally, the threshold can be higher than the voltage to which the battery pack is or can be discharged before recharging or is higher than the low voltage of the voltages between which the battery pack is being cycled.

The electronics include one or more battery assembly switches configured to electrically disconnect the battery assembly from the terminal. For instance, FIG. 1A illustrates the battery pack including a first switch 49 and a second switch 50 in electrical communication with the processor 36. The first switch 49 and the second switch 50 are each configured to electrically disconnect the battery assembly 10 from the terminals 34 and accordingly stopping the current flow through the battery assembly 10. For instance, the electronics 32 can open the first switch 49 and/or the second switch 50 to disconnect the battery assembly 10 from the terminals 34 and accordingly to disrupt the current flow from the terminals 34. The electronics 32 can close the first switch 49 and/or the second switch 50 so as to connect the battery assembly 10 to the terminals 34 and accordingly permit current flow through the terminals 34. A suitable first switch 49 includes, but is not limited to, a transistor such as a Field Effect Transistor (FET). A suitable second switch 50 includes, but is not limited to, a transistor such as a Field Effect Transistor (FET). The electronics 32 can employ the first switch 49 and/or the second switch 50 to disconnect the battery assembly 10 from the electrical contacts in the event that the current through the battery assembly 10 exceeds an upper system current threshold, and/or in the event that the voltage of the battery assembly 10 exceeds an upper system voltage threshold, and/or in the event that the voltage of the battery assembly 10 falls below a lower system voltage threshold. In some instances, the electronics 32 employ the first switch 49 and/or the second switch 50 to disconnect the battery assembly 10 from the electrical contacts in the event that the voltage of one or more parallel groups rises above an upper threshold while charging the battery pack or fall below a lower threshold while discharging the battery pack.

FIG. 1A illustrates the electronics 32 including two battery assembly switches because some switches such as Field Effect Transistors are sensitive to the current direction. Accordingly, one of the switches can be employed to disconnect the terminals 34 from the battery assembly 10 when the battery pack is charging and the other switch can be employed to disconnect the terminals 34 from the battery assembly 10 when the battery pack is discharging. For instance, the first switch 49 can be employed to disconnect the terminals 34 from the battery assembly 10 when the battery pack is charging and the second switch 50 can be employed to disconnect the terminals 34 from the battery assembly 10 when the battery pack is discharging. As a result, the switch that is employed by the electronics 32 to disconnect the terminals 34 from the battery assembly 10 can depend on whether the battery assembly 10 is being charged or discharged.

When the first switch 49 and the second switch 50 are not sensitive to current direction, a single switch can replace the first switch 49 and the second switch 50.

Although the first switch 49 and the second switch 50 are shown as positioned electrically between the battery assembly 10 and the processor 36, the first switch 49 and/or the second switch 50 can be electrically positioned between the processor 36 and a terminal or the terminals. When a single switch provides the functions of the first switch 49 and the second switch 50, the switch can be electrically positioned between the processor 36 and a terminal or the terminals.

As noted from the above discussion, the electronics 32 can include shunt circuits 44 that the electronics 32 use to bypass a parallel group when the voltage of the parallel group exceeds an upper threshold while charging the battery pack and the electronics 32 include a first switch 49 that disconnects the battery assembly 10 from the terminals 34 when the voltage of a parallel group exceeds an upper threshold. Accordingly, in instances where the functions performed by the shunt circuits 44 and the first switch 49 are redundant, the shunt circuits 44 or the first switch 49 can be optional. Alternately, the first switch 49 can serve as a back-up for the shunt circuit 44. For instance, the upper threshold at which the first switch 49 is opened can be higher than the upper threshold at which the switch 46 for a shunt circuit 44 is closed.

The electronics 32 can include a fuse 51 positioned such that when the fuse is activated, the battery assembly 10 is disconnected from the terminals 34. The fuse 51 can serve as a back-up to the shunt circuits 44, the first switch 49, and the second switch 50. For instance, if the shunt circuits 44, the first switch 49, and the second switch 50 fail to reduce the current through the battery assembly 10, the fuse can activate so as to disconnect the battery assembly 10 from the terminals 34.

Although FIG. 1A illustrates the secondary parallel lines 22 providing electrical communication between the series groups 14 such that a battery 16 in one of the series groups 14 is connected in parallel with a battery 16 in each of the other series groups 14, the secondary parallel lines 22 can provide electrical communication between the series groups 14 such that a battery 16 in one of the series groups 14 is connected in parallel with a battery 16 in a portion of the other series groups 14.

The battery assemblies 10 of FIG. 1A and FIG. 1B can include other electrical connections between the primary parallel lines 12. For instance, other batteries and/or series groups can be connected between the primary parallel lines 12 but not otherwise electrically connected to the illustrated series groups. Further, the battery assembly 10 can include other components between the primary parallel lines 12.

U.S. Provisional Patent Application Ser. No. 60/740,150, filed on Nov. 28, 2005, entitled "Battery System Configured To Survive Failure of One or More Batteries," is incorporated herein in its entirety and discloses a method for charging and discharging a battery pack having a battery assembly 10 constructed according to FIG. 1A through FIG. 1B such that the battery pack can survive failure of one or more batteries without a substantial drop in the capacity in the battery pack. The electronics 32 can be configured to charge and discharge the battery pack in accordance with U.S. Provisional Patent Application Ser. No. 60/740,150. U.S. Provisional Patent Application Ser. No. 60/753,862, filed on Dec. 22, 2005, and entitled "Battery Pack System" is incorporated herein in its entirety and discloses intermittently dropping the battery pack current from a first level to a second level while charging and/or discharging the battery pack. The electronics 32 can be configured to intermittently dropping the battery pack current from the first level to the second level in accordance with U.S. Provisional Patent Application Ser. No. 60/753,862. U.S. Provisional Patent Application Ser. No. 60/753,862 also teaches battery disconnection devices in series with each of the batteries and/or integrated into each of the batteries. The battery disconnection devices can disconnect a battery from the battery assembly 10 to stop or reduce current flow through a battery to prevent damage to the battery or to the battery assembly 10. The battery disconnection devices can address undesirable increases in pressure in the battery, undesirable increases in the temperature of a battery, or undesirable current levels through a battery. The battery assembly 10 can employ the battery disconnection devices disclosed in U.S. Provisional Patent Application Ser. No. 60/753,862.

The battery pack can be configured to provide more than 9 V or more than 12 V. Additionally or alternately, the battery packs can be configured to provide more than 50 watt-hours, more than 100 watt-hours or more than 240 watt-hours. Many of the advantages associated with the battery pack do not become evident until the battery pack is used for applications requiring high power levels. As a result, the battery pack is suitable for high power applications such as powering the movement of vehicles such as trucks, cars and carts. For these high power applications, the battery pack is preferably configured to provide more than 18 V, more than 24 V or more than 32 V. Additionally or alternately, the battery pack is preferably configured to provide more than 240 watt-hours, more than 500 watt-hours or more than 1000 watt-hours. In some instances, the above performance levels are achieved using a battery pack where the batteries in the series groups 14 each have a voltage of less than 14 V, 10 V or 5 V.

The batteries can be secondary batteries. Each battery can include one cell or more than one cell. In some instances, one or more of the batteries are configured to provide more than 9 V or more than 12 V. Additionally or alternately, the batteries can be configured to provide more than 50 watt-hours, more than 100 watt-hours or more than 240 watt-hours. When the battery pack is used for applications requiring high power levels such as powering the movement of vehicles such as trucks, cars and carts, the batteries are preferably configured to provide more than 18 V, more than 24 V or more than 32 V. Additionally or alternately, the batteries are preferably configured to provide more than 240 watt-hours, more than 500 watt-hours or more than 1000 watt-hours.

Figure 2A:
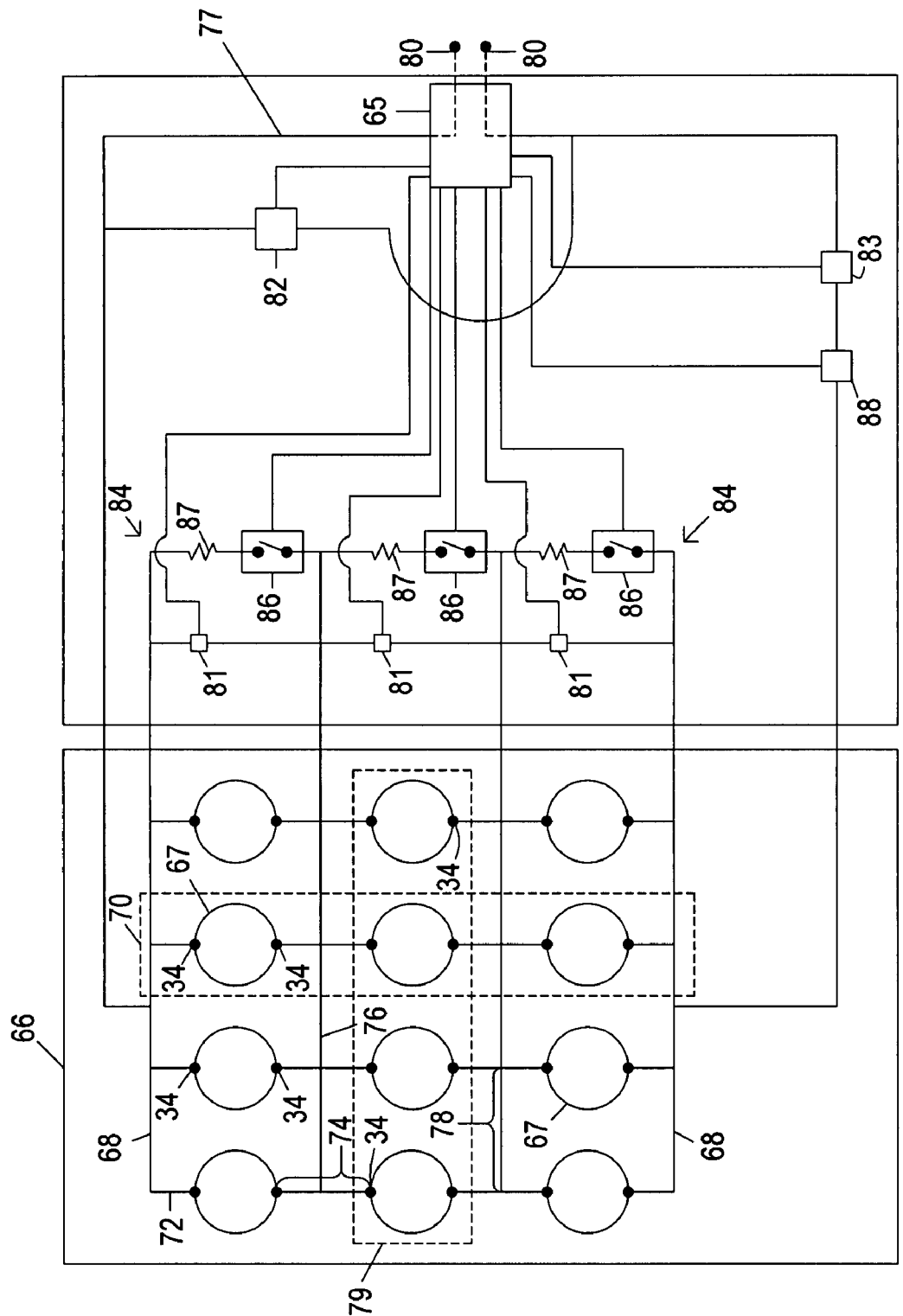
FIG. 2A is a schematic for a battery pack system that includes a plurality of battery packs. The battery pack system includes a controller in electrical communication with a pack assembly.

FIG. 2A is a schematic of a battery pack system. The battery pack system includes a pack assembly 66. The pack assembly 66 includes a plurality of battery packs 67. All or a portion of the battery packs 67 can be constructed according to FIG. 1A through FIG. 1B. Alternately, different battery pack 67 constructions can be employed. Further, the battery packs 67 can have battery assemblies according to FIG. 1A and FIG. 1B but can employ electronics with different functions or can exclude electronics altogether.

The pack assembly 66 includes two primary parallel conductors 68 that connect three system series groups 70 in parallel. The system series groups 70 each include three battery packs 67 connected in series. Primary series conductors 72 each provide electrical communication between a system series group 70 and a primary parallel conductor 68 and secondary series conductors 74 provide electrical communication between the battery packs 67 connected in series.

The pack assembly 66 also includes a plurality of secondary parallel conductors 76. The secondary parallel conductors 76 each include one or more cross conductors 78 that provide electrical communication between the secondary series conductors 74 in different system series groups 70. Accordingly, each secondary parallel conductor 76 provides a parallel connection between the battery packs 67 in different system series group 70. For instance, each secondary parallel conductor 76 provides electrical communication between different system series groups 70 such that a battery pack 67 in one of the system series groups 70 is connected in parallel with a battery pack 67 in the other system series groups 70. Because a single secondary parallel conductor 76 only provides one of the parallel connections, another connection is needed to connect battery packs 67 in parallel. The other parallel connection can be provided by another secondary parallel conductor 76 or by a primary parallel conductor 68. Each of the battery packs 67 connected in parallel belongs to a system parallel group 79. Accordingly, the pack assembly 66 of FIG. 2A includes three system parallel groups 80.

Another embodiment of the pack assembly includes a plurality of system parallel groups connected in series without system series groups.

The pack assembly 66 of FIG. 2A can be scaled to include more battery packs 67 or fewer battery packs 67. For instance, the system can include four or more battery packs 67, twelve or more battery packs 67, twenty-five or more battery packs 67, eighty-one or more battery packs 67, one hundred or more battery packs 67. The number of battery packs 67 in each system parallel group 79 can be the same or different from the number of battery packs 67 in each system series group 70. The number of battery packs 67 in each system series group 70 can be increased in order to increase the voltage of the system or decreased in order to decrease the voltage of the system. Each system series group 70 can include two or more battery packs 67; four or more battery packs 67; more than eight battery packs 67; or fifteen or more battery packs 67. The number of system series groups 70 can be increased for applications that require higher power levels or decreased for applications that require lower power levels. In some instances, the pack assembly 66 includes one or more system series groups 70 and one or more system parallel groups. In one embodiment, the pack assembly includes only one system parallel group and no series groups. The pack assembly can include two or more system series groups 70; four or more system series groups 70; ten or more system series groups 70; or fifteen or more system series groups 70.

Although FIG. 2A illustrates the secondary parallel conductors 76 providing electrical communication between the system series groups 70 such that a battery pack 67 in one of the system series groups 70 is connected in parallel with a battery pack 67 in each of the other system series groups 70, the secondary parallel conductors 76 can provide electrical communication between the system series groups 70 such that a battery pack 67 in one of the system series groups 70 is connected in parallel with a battery pack 67 in a portion of the other system series groups 70.

The pack assembly 66 can include electrical connections between the primary parallel conductors 68 other than the electrical connections shown in FIG. 2A. For instance, other battery packs 67 and/or system series groups 70 can be connected between the primary parallel conductors 68 but not otherwise electrically connected to the illustrated system series groups 70. Further, the pack assembly 66 can include other components. For instance, the pack assembly 66 can include fuses positioned such that if a battery pack 67 shorts, the battery pack 67 is no longer in electrical communication with the rest of the battery packs 67 in the pack assembly 66. For instance, a fuse can be associated with each battery pack 67 and placed in series with the associated battery pack 67. Accordingly, the fuses can prevent a battery pack 67 that shorts in a system parallel group 79 from shorting the other battery pack 67 in the system parallel group 79. Suitable fuses include, but are not limited to, traditional fuse devices and bi-metal switching devices.

The battery pack system includes a controller 77 in electrical communication with the pack assembly and with terminals 80 that serve as the terminals 80 for the battery pack system. Accordingly, the output for the battery pack system can be received at the terminals 80. The battery pack system can be recharged by applying a potential across the terminals 80.

The controller includes a processing unit 65 for controlling functions of the controller or of the battery pack system. Suitable processing units 65 include, but are not limited to, firmware, hardware and software or a combination thereof. Examples of suitable processing units 65 include, but are not limited to, analog electrical circuits, digital electrical circuits, processors, microprocessors, digital signal processors (DSPs), computers, microcomputers, ASICs, and discrete electrical components, or combinations suitable for performing the required control functions. In some instances, the controller 64 includes one or more memories and one or more processors such as a CPU. The one or more memories can include instructions to be executed by the processing unit during performance of the control and monitoring functions for the battery pack system.

In some instances, the controller is in electrical communication with the electronics in one or more of the battery packs 67. In some instances, the controller is in electrical communication with the electronics in each of the battery packs 67. The controller and the electronics can exchange information. As will become evident below, in some instances, the controller can control some aspects of the operation of the electronics in a battery pack 67.

The controller includes one or more first voltage sensors 81 in electrical communication with the processing unit. The controller can employ each first voltage sensors to monitor the voltage of a system parallel group. A suitable volt sensor includes, but is not limited to, a voltmeter. The controller includes a second voltage sensor 82 in electrical communication with the processing unit. The controller can employ the second voltage 82 sensor to monitor the voltage of the pack assembly. A suitable sensor includes, but is not limited to, a voltmeter. The controller includes a current sensor 83 in electrical communication with the processing unit. The controller can employ the current sensor 83 to monitor the current through the pack assembly during the charging and/or discharging of the battery pack system. A suitable current sensor 83 includes, but is not limited to, an ammeter.

The pack assembly 66 can include one or more shunt circuits 84 connected in parallel with a system parallel group. A shunt circuit 84 can include one or more switches 86 and one or more resistors 87. For instance, the pack assembly 66 of FIG. 2A includes a plurality of shunt circuits 84 that are each configured to provide a current pathway around a system parallel group. Each shunt circuit 84 includes a switch 86 connected in series with a resistor 87. The switches 86 can be operated by the controller. Each switch 86 is arranged such that one of the system parallel groups is bypassed when the switch 86 is closed and but the shunt circuit 84 is an open circuit when the switch 86 is open. Accordingly, the system parallel group is not bypassed when switch 86 is open. When a switch 86 is closed, the associated resistor 87 is selected to prevent the functioning batteries in the bypassed system parallel group from being short-circuited.

During operation of the pack assembly, a differential may develop between the voltage of different system parallel groups. In some instances, the voltage of one or more system parallel groups may rise to levels that are undesirably high or fall to levels that are undesirably low. For instance, the voltage of one or more system parallel groups may rise above an upper threshold while charging the battery pack 67 or fall below a lower threshold while discharging the battery pack 67. Examples of the upper threshold include, but are not limited to, the maximum operational voltage of the battery pack 67, the maximum voltage to which the battery pack 67 should be charged, a threshold above which damage to the battery packs 67 in a system parallel group may occur or above which the battery packs 67 becomes unsafe for normal operation. Examples of the lower threshold include, but are not limited to, the minimum operational voltage of the batter pack, or a threshold below which damage to the battery packs 67 in a system parallel group may occur. In these instances, the electronics can employ a switch 86 in a shunt circuit 84 to provide a bypass around the system parallel group that is above the upper threshold or below the lower threshold. As a result, that system parallel group is effectively removed from the pack assembly permitting continued charging and/or discharging of the pack assembly.

In some instances, the controller closes the switch 86 in an open shunt circuit 84 after the pack assembly is done charging or discharging. For instance, when the switch 86 in one or more shunt circuits 84 is opened while charging, the controller can close those switches 86 after charging is complete to return the bypassed system parallel groups to the pack assembly. As a result, the battery packs 67 in those system parallel groups contribute to any subsequent discharge of the battery pack system.

When the controller opens or closes the switches 86 in one or more of the shunt circuits 84, the controller can adjust one or more other parameters that the controller employs in the charge or discharge of the battery pack system. For instance, when the controller open a switch 86 in a shunt circuit 84, the controller can reduce the voltage to which the pack assembly is charged to prevent over-charging of the pack assembly.

The controller can also employ the shunt circuits 84 in response to other fault condition in the battery pack 67 assembly. For instance, a system parallel group that includes a battery pack 67 that has or develops an unusually high self-discharge may contribute to the functioning of the battery pack 67 for several cycles but subsequent cycling may cause the voltage of the system parallel group to drop to an undesirably low level that can adversely affect the performance of the battery pack 67 assembly. Accordingly, the controller can employ a shunt circuit 84 to bypass a system parallel group once the voltage of the system parallel group falls below a threshold. When the controller employs a shunt circuit 84 in response to the voltage of a parallel group falling below a threshold, the shunt circuit 84 is preferably employed when the voltage of the parallel group is at or below the threshold to reduce the issues associated with shorting of more highly charged batteries as a result of employing the shunt circuit 84. The threshold can be higher than the minimum operational voltage of the battery packs 67 in the pack assembly. Additionally, the threshold can be higher than the voltage to which the pack assembly is or can be discharged before recharging or is higher than the low voltage of the voltages between which the battery pack 67 assembly is being cycled.

The controller includes a pack assembly switch 88 in electrical communication with the processor. The controller can open the switch to disconnect the pack assembly from the terminals 80 and accordingly to disrupt the current flow from the pack assembly through the terminals 80 or from the terminals 80 through the pack assembly. The electronics can close the first switch and/or the second switch so as to electrically connect the pack assembly to the terminals 80 and accordingly permit current flow through the terminals 80. A suitable switch includes, but is not limited to, a relay switch. The controller can employ the first switch and/or the second switch in the event that the current through the pack assembly exceeds a charging assembly current threshold or a discharging assembly current threshold. The charging assembly current threshold can be the same or different from the discharging current assembly threshold.

The controller can also open the switch in response to more than a threshold number of battery packs 67 in a system parallel group being disconnected from the pack assembly. For instance, when the electronics in a battery pack 67 constructed according to FIG. 1A opens the first switch and/or the second switch so as to disconnect the battery assembly from the terminals 80, that battery pack 67 is effectively disconnected from the pack assembly.

The threshold number can be equal to the total number of battery packs 67 in a system parallel group minus one. When only one battery pack 67 in a system parallel group is connected and the electronics in that pack assembly disconnect that battery pack 67 from the parallel group, the first switch and/or the second switch in each of the battery packs 67 in that system parallel group is exposed to the voltage of the entire pack assembly. Since these switches can be low voltage switches such as FETs, the exposure of these switches to the voltage of the system can cause the failure of these battery packs 67 and accordingly the failure of the entire battery pack system. To prevent this failure, the battery pack system can open the switch before the last battery pack 67 in a system parallel group becomes disconnected from the pack assembly. As a result, the switch permits the use of low voltage switches such as FETs in the individual battery packs 67.

The controller can be in communication with the electronics in different battery packs 67 in order to open the switch before more than a threshold number of battery packs 67 in a system parallel group are disconnected from the pack assembly. For instance, the electronics in a battery pack 67 can notify the controller when the electronics disconnect the battery pack 67 from the pack assembly. The controller can track the number of battery packs 67 that are disconnected in each system parallel group. When disconnection of a battery pack 67 in a system parallel group would result in the threshold number being exceeded, the controller can open the switch when it receives the notification from the electronics in a battery pack 67 in that system parallel group. In some instances, the electronics in each of the battery packs 67 is configured to notify the controller that they are going to disconnect the battery pack 67 before actually disconnecting the battery pack 67 in order to give the controller time to open the switch. Alternately, the electronics in each of the battery packs 67 can be configured to disconnect the battery pack 67 before giving notice to the controller. However, when disconnection of one more battery pack 67 would exceed the threshold number for that system parallel group, the controller can issue a command that causes the battery packs 67 that remain connected in that system parallel group to provide notice before disconnecting.

Opening of the switch exposes the switch to the voltage of the entire pack assembly. As a result, the switch is a high voltage switch such as a relay. The ability to use a high voltage switch such as a relay in conjunction with the pack assembly but to use lower voltage switches such as FETs in the battery packs 67 reduces the cost and size of the battery pack system. The switch in the battery pack system preferably has a voltage tolerance that is more than 10 times, 20 times or 40 times the voltage tolerance of the first switch and/or the second switch in the battery packs 67. Additional or alternately, the voltage tolerance of the first switch and/or the second switch in the battery packs 67 can be less than $\frac{1}{10}$, $\frac{1}{20}$ times or $\frac{1}{40}$ the voltage tolerance the switch in the battery pack system. As noted above, this arrangement can permits the one or more battery assembly switches to be transistors such as Field Effect Transistors (FET). FETs generally have a voltage tolerance less that 50V. Accordingly, in some instances, the one or more battery assembly switches have a voltage tolerance less that 50V.

U.S. Provisional Patent Application Ser. No. 60/740,150, filed on Nov. 28, 2005, entitled "Battery System Configured To Survive Failure of One or More Batteries," is incorporated herein in its entirety and discloses a method for charging and discharging a battery pack 67 having a battery assembly 10 constructed according to FIG. 1A through FIG. 1C such that the battery pack 67 can survive failure of one or more batteries without a substantial drop in the capacity in the battery pack 67. The controller 64 can charge and discharge the pack assembly 66 in accordance with the disclosure of U.S. Provisional Patent Application Ser. No. 60/740,150. U.S. Provisional Patent Application Ser. No. 60/753,862, filed on Dec. 22, 2005, and entitled "Battery pack system" is incorporated herein in its entirety and discloses intermittently dropping the current of a battery pack 67 from a first level to a second level while charging and/or discharging the battery pack 67. The controller can be configured to intermittently drop the current of the pack assembly 66 from a first level to a second level in accordance with U.S. Provisional Patent Application Ser. No. 60/753,862.

In some instances, the battery packs 67 in a pack assembly 66 can be different from one another. For instance, a portion of the battery packs 67 can be high power sources and a portion of the battery packs 67 can be low power sources. In one example, the battery pack 67 assembly includes only one system parallel group that includes one or more high power sources and one or more low power sources. A high power source has a mass based power density (gravimetric power density) that is more than the mass based power density of the low power sources. Additionally or alternately, the low power sources can have an impedance that is more than three times the impedance of the high power sources. Additionally or alternately, a low power source can have a capacity that is more than the capacity of a high power source. In some instances, the high power sources have a mass based power density that is more than twice the mass based power density of the low power sources before discharge of the pack assembly or that is more than four times the mass based power density of the low power sources before discharge of the pack assembly. Additionally or alternately, in some instances, at least one low power source has a capacity that is greater than a capacity of at least one high power source or that is greater than 1.2 times the capacity of at least one high power source.

Figure 2B:
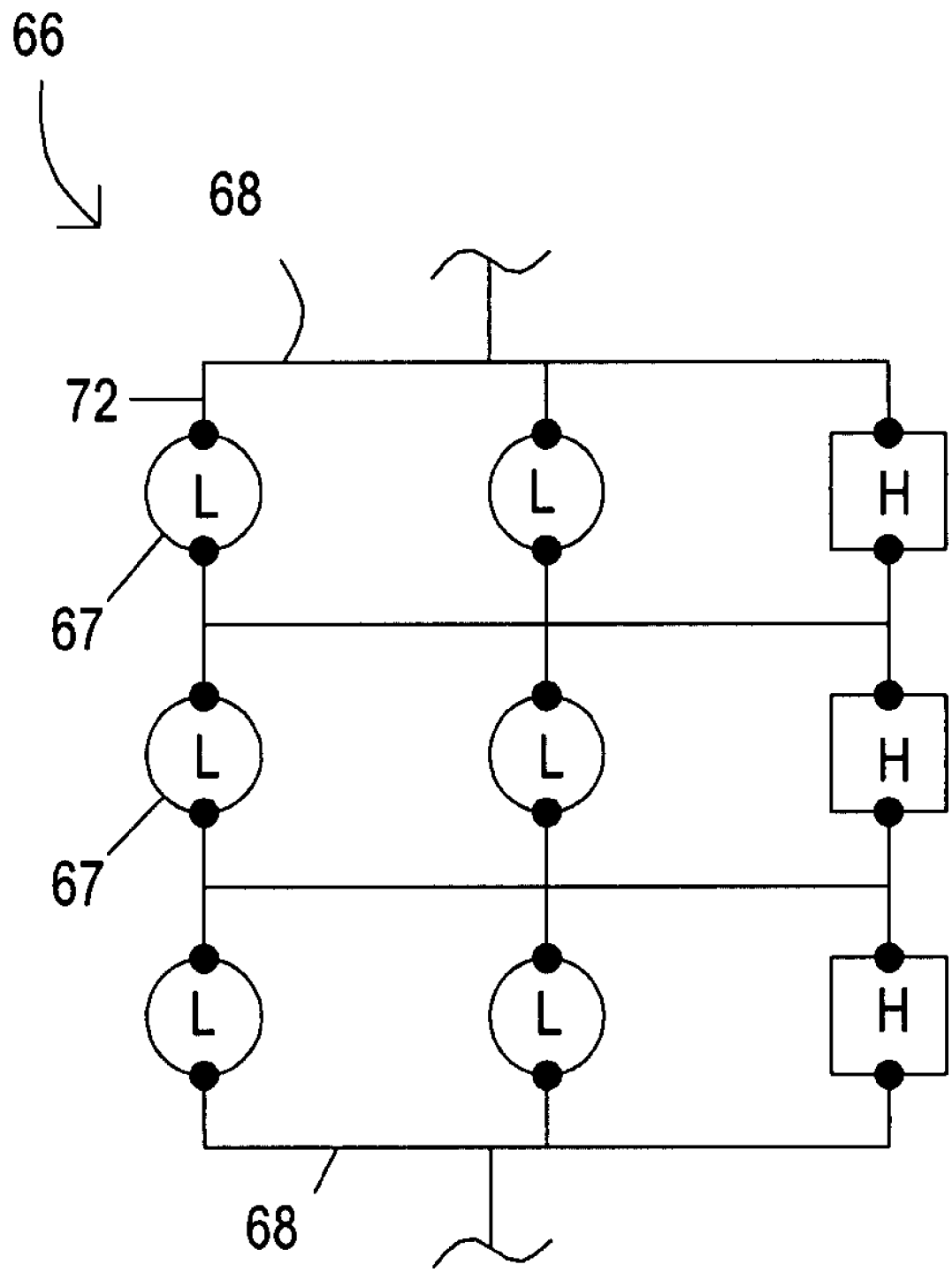
FIG. 2B is a schematic for a pack assembly that includes both high power sources and low power sources.

Each system parallel group 79 can include one or more high power sources and one or more low power sources. The battery packs 67 can be arranged such that one or more system series groups 70 include only high power sources and one or more system series groups 70 include only low power sources. For instance, FIG. 2B is a schematic for a pack assembly 66 with one system series group 70 that employs only high power sources as illustrated by the battery packs 67 labeled H and two system series groups 70 that employ only low power sources as illustrated by the battery packs 67 labeled L. In one example, the pack assembly 66 has only one parallel group that includes one or more high power sources and one or more low power sources. Since the high power sources can have a mass based power density that is more than the mass based power density of the low power sources and the low power sources can have an impedance that is more than the impedance of the high power sources, the current can flow primarily from the high power sources during high power applications such as pulsing. When the power demands on the pack assembly drops, the portion of the current provided by the low power sources increases. During the high power application, the low power sources will have discharged less energy than the high power sources. As a result, the high power sources will be associated with a higher voltage drop than the low power sources. However, because the parallel lines maintain the power sources in the same parallel group at the same voltage, the low power sources will recharge the high power sources. This arrangement permits the pack assembly to repeatedly satisfy the requirements of high power applications and low power applications.

Additional details about the construction, operation, and/or electronics for a battery pack and battery pack systems can be found in U.S. Provisional Patent Application Ser. No. 60/601,285; filed on Aug. 13, 2004; entitled "Battery Pack;" and in U.S. patent application Ser. No. 11/201,987; filed on Aug. 10, 2005; and entitled "Battery Pack;" and in U.S. Patent Application Ser. No. 60/707,500; filed on Aug. 10, 2005; and entitled "Battery System;" and in U.S. Provisional Patent Application Ser. No. 60/740,150; filed on Nov. 28, 2005; and entitled "Battery System Configured to Survive Failure of One or More Batteries;" and in U.S. Provisional Patent Application Ser. No. 60/740,202; filed on Nov. 28, 2005; and entitled "Battery Pack System;" and in U.S. patent application Ser. No. 11/269,285; filed on Nov. 8, 2005; and entitled "Modular Battery Pack;" and in U.S. Provisional U.S. Patent Application Ser. No. 60/740,204, filed on Nov. 28, 2005, entitled "Battery Pack System;" and in U.S. Provisional U.S. Patent Application Ser. No. 60/753,862, filed on Dec. 22, 2005, entitled "Battery Pack System;" each of which is incorporated herein in its entirety. When possible, the functions of the electronics described in the above applications can be performed by the electronics of this application in addition to the functions described in this application. When possible, the functions of the electronics and/or controllers described in the above applications can optionally be performed in addition to the functions described in this application.

Although the function of the electronics of FIG. 1A and the controller 64 of FIG. 2A are described separately, in many instances, all or a portion of the electronics functions are incorporated into the controller. Accordingly, in some instances, the battery packs 67 can exclude the electronics. Alternately, all or a portion of the controller functions can be incorporated into the electronics.

Figure 3:
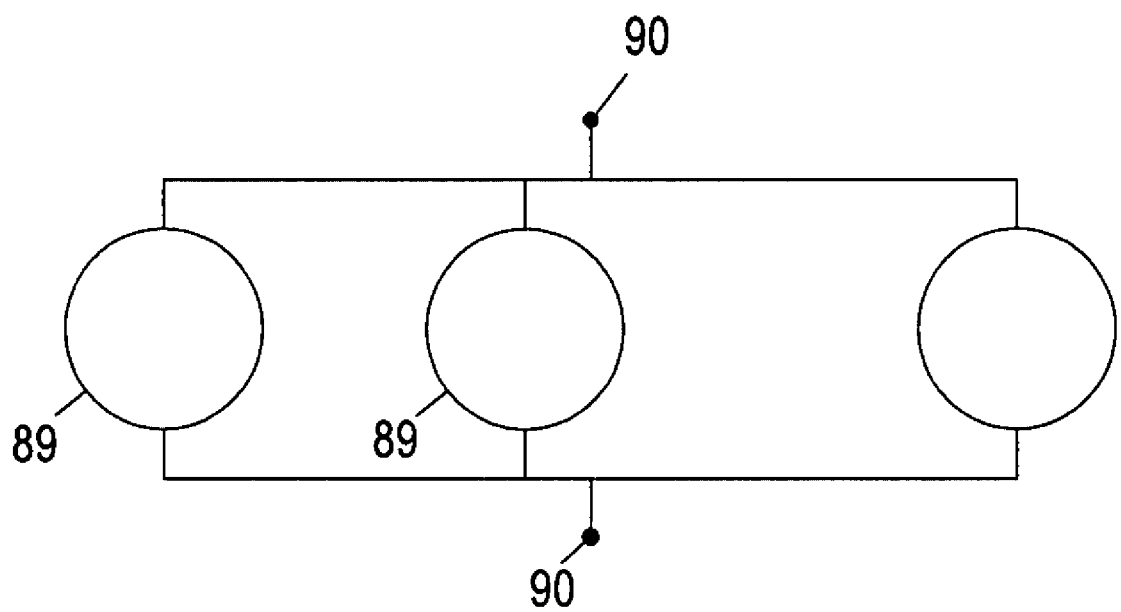
FIG. 3 illustrates a power source having a plurality of the battery pack systems connected in parallel.

A power source 89 can include one or more of the battery pack systems. For instance, FIG. 3 illustrates a power source 89 having a plurality of the battery pack systems connected in parallel. The battery pack systems are in electrical communication with terminals 90 that can serve as the terminals for the power source 89. When the controller in a battery pack system opens a pack assembly switch, the controller effectively disconnects the battery pack system from the power source 89.

Figure 4:
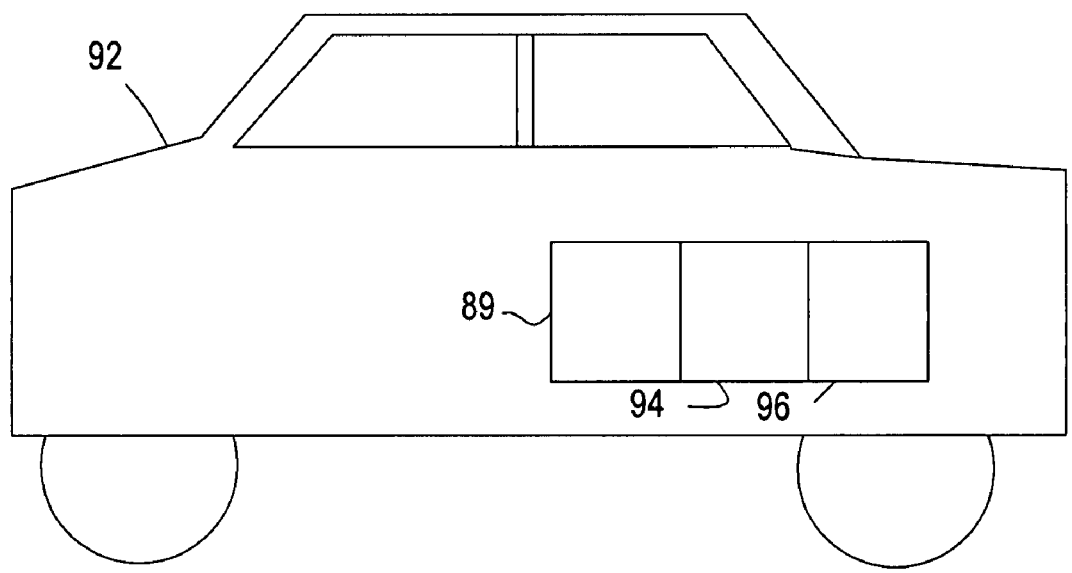
FIG. 4 illustrates a battery pack system employed in a vehicle.

The battery pack system can be employed to power movement of a vehicle. Examples of suitable vehicles are vehicles configured to hold and transport living people such as cars, truck and golf-carts. In some instances, the vehicles are for transporting people on land. FIG. 4 illustrates a power source 89 employed in a vehicle 92. The power source 89 provides an electrical signal to a drive source 94 which is connected to a power train 96. The power train is configured to transmit power from the power source 89 to a drive mechanism (not shown) such as a drive axel. The drive source can include a motor and/or engine. The power source 89 can assist the motor and/or engine in generating movement of the vehicle 92. Alternately, the power source 89 can be the only source of power provided to the drive source. Although the power source 89 is disclosed in the context of powering vehicles, the power source 89 can be employed in other applications. Although the vehicle is illustrated as a car, the vehicle can be a different vehicle for transporting people such as a plane, ship, or a crane.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A power source, comprising:
a battery pack system having a pack assembly, the pack assembly including a plurality of system parallel groups connected in series, each system parallel group including a plurality of battery packs connected in parallel;
each battery pack including
a battery assembly having a plurality of parallel groups connected in series, each parallel group including a plurality of batteries connected in parallel, and
electronics configured to disconnect the battery pack from the pack assembly.

2. The system of claim 1, wherein the battery assembly includes a plurality of series groups that each have a plurality of the batteries connected in series.

3. The system of claim 1, wherein the pack assembly includes a plurality of system series groups that each have a plurality of the battery packs connected in series.

4. The system of claim 1, wherein the electronics include a switch in series with the battery assembly.

5. The system of claim 1, wherein the electronics include a switch configured so as to electrically connect and electrically disconnect the battery assembly from pack assembly.

6. The system of claim 1, wherein the battery pack system includes a controller configured to electrically disconnect the pack assembly from the power source.

7. The system of claim 6, wherein the controller includes a pack assembly switch configured so as to electrically connect and electrically disconnect the pack assembly from the power source.

8. The system of claim 7, wherein the electronics include a battery assembly switch configured so as to electrically connect and electrically disconnect the battery assembly from the pack assembly.

9. The system of claim 7, wherein the battery assembly switch has a voltage tolerance less than 1/20th of the voltage tolerance of the pack assembly switch.

10. A power source, comprising:
   a battery pack system having a pack assembly, the pack assembly including a plurality of system parallel groups connected in series and a plurality of series groups connected in parallel, each system parallel group including a plurality of battery packs connected in parallel and each system series group including a plurality of the battery packs connected in series;
   the battery pack system including a pack assembly switch configured so as to electrically connect and disconnect the pack assembly from the power source;
   each battery pack including a battery assembly having a plurality of parallel groups connected in series and a plurality of series groups connected in parallel, each parallel group including a plurality of batteries connected in parallel, and each series group including a plurality of the batteries connected in series;
   the battery pack including a battery assembly switch configured so as to electrically connect and electrically disconnect the battery assembly from the pack assembly; and
   the battery assembly switch has a voltage tolerance less than 1/20th of the voltage tolerance of the pack assembly switch.

* * * * *